United States Patent
Douglas

(10) Patent No.: US 9,296,044 B2
(45) Date of Patent: Mar. 29, 2016

(54) COMPOSITE HONEYCOMB STRUCTURE

(75) Inventor: Alan Richard Douglas, Chula Vista, CA (US)

(73) Assignee: ROHR, INC., Chula Vista, CA (US)

( * ) Notice: Subject to any disclaimer, the term of this patent is extended or adjusted under 35 U.S.C. 154(b) by 1116 days.

(21) Appl. No.: 13/095,558

(22) Filed: Apr. 27, 2011

(65) Prior Publication Data
US 2011/0200786 A1 Aug. 18, 2011

Related U.S. Application Data

(62) Division of application No. 11/465,499, filed on Aug. 18, 2006, now Pat. No. 7,954,224.

(51) Int. Cl.
| | |
|---|---|
| *B32B 3/12* | (2006.01) |
| *B23B 3/12* | (2006.01) |
| *B21D 39/02* | (2006.01) |
| *G10K 11/172* | (2006.01) |
| *B32B 3/18* | (2006.01) |
| *F16B 5/01* | (2006.01) |
| *B64D 33/02* | (2006.01) |

(52) U.S. Cl.
CPC .............. *B23B 3/12* (2013.01); *B21D 39/021* (2013.01); *B32B 3/18* (2013.01); *G10K 11/172* (2013.01); *B32B 2307/102* (2013.01); *B32B 2605/18* (2013.01); *B64D 2033/0206* (2013.01); *F16B 5/01* (2013.01); *Y10T 29/4957* (2015.01); *Y10T 29/4973* (2015.01); *Y10T 29/49718* (2015.01); *Y10T 29/49908* (2015.01); *Y10T 29/49924* (2015.01); *Y10T 29/49936* (2015.01); *Y10T 428/12493* (2015.01); *Y10T 428/24149* (2015.01)

(58) Field of Classification Search
None
See application file for complete search history.

(56) References Cited

U.S. PATENT DOCUMENTS

| 1,000,758 | A | | 8/1911 | Rude | |
|---|---|---|---|---|---|
| 1,191,835 | A | * | 7/1916 | Salmon, Jr. | ..................... 29/33.5 |
| 2,284,229 | A | | 5/1942 | Palmer | |
| 2,339,219 | A | | 1/1944 | Crowley | |
| 2,766,712 | A | * | 10/1956 | Parsons | ........................... 72/179 |
| 2,772,757 | A | * | 12/1956 | Hammond | ...................... 29/521 |
| 3,071,216 | A | | 1/1963 | Jones et al. | |

(Continued)

FOREIGN PATENT DOCUMENTS

DE     299 12 194 U1     11/1999

OTHER PUBLICATIONS

European Extended Search Report (EP Appln. No. 07014222.9, filed Jul. 19, 2007) mailed Feb. 4, 2011, pp. 1-6.

*Primary Examiner* — David Sample
*Assistant Examiner* — Nicholas W Jordan
(74) *Attorney, Agent, or Firm* — Snell & Wilmer, LLP

(57) ABSTRACT

Adjoining edges of adjacent honeycomb core panel sections are mechanically interlocked. In one embodiment, the method includes forming a first edge along a first cellular core panel section. The first edge includes a first plurality of edge cell walls along the first edge. The method further includes forming a second edge along a second cellular core panel section, wherein the second edge includes a second plurality of edge cell walls along the second edge. The first edge is positioned proximate to the second edge. At least a portion of at least one of the first plurality of edge cell walls is mechanically interlocked with at least a portion of at least one of the second plurality of edge cell walls to form a joint therebetween. The invention also includes a composite structure at least partially produced by such a method.

7 Claims, 8 Drawing Sheets

(56) References Cited

U.S. PATENT DOCUMENTS

| | | |
|---|---|---|
| 3,160,131 A | 12/1964 | George et al. |
| 3,256,649 A * | 6/1966 | Webb .................... 52/2.26 |
| 3,604,464 A | 9/1971 | Pelley |
| 4,621,942 A | 11/1986 | Hill |
| 5,380,579 A | 1/1995 | Bianchi |
| 5,938,875 A * | 8/1999 | Jessup et al. .................... 156/79 |
| 6,240,640 B1 | 6/2001 | Matsuoka et al. |
| 6,544,628 B1 | 4/2003 | Aull |
| 6,834,468 B1 | 12/2004 | Kroie |
| 6,877,205 B2 | 4/2005 | Aull et al. |
| 7,452,585 B1 | 11/2008 | Wong et al. |
| 7,541,085 B2 | 6/2009 | Burdon |
| 8,047,326 B2 * | 11/2011 | Valleroy et al. ................ 181/214 |
| 2007/0015000 A1 | 1/2007 | Burdon |
| 2008/0047121 A1 | 2/2008 | Douglas |

* cited by examiner

COMPOSITE HONEYCOMB STRUCTURE

RELATED APPLICATIONS

This is a Divisional of U.S. patent application Ser. No. 11/465,499, filed Aug. 18, 2006, now U.S. Pat. No. 7,954,224. The contents of the aforementioned application are incorporated by reference in their entirety.

FIELD OF THE INVENTION

The invention generally relates to composite structures, and more particularly relates to methods of joining honeycomb composite sandwich panel sections in edge-to-edge relation and composite panels resulting from such methods.

BACKGROUND

Aircraft engines generate a substantial amount of noise. In high population areas and other noise controlled environments, aircraft engine noise can be problematic. In order to reduce the noise generated by modern aircraft engines, aircraft manufacturers often line the aircraft engine nacelle and surrounding engine areas with acoustic liners that at least partially suppress the amount of noise radiated by the engines to the surrounding environment. Such acoustic liners typically include honeycomb composite sandwich panels configured to absorb or dissipate sound energy. As used herein, the term "honeycomb" refers to an array of open cells formed by a matrix of interconnected cell walls. Though such cells often have hexagonal cross-sections (like that of a honeycomb built by honeybees), composite acoustic sandwich panels also can include arrays of cells with other polygonal or non-polygonal shapes. Accordingly, the term "honeycomb" is used herein to refer to arrays of open cells that having no particular shape or cross-section. Often, the cell walls of acoustic honeycomb cores are constructed of thin metal foil such as aluminum or titanium.

An acoustic liner panel typically includes an imperforate backing sheet covering one face of the honeycomb core, and an air permeable face sheet covering the opposite face of the core. The air permeable face sheet permits sound energy to propagate through the face sheet and into the open cells, where at least some of the sound energy is dissipated and/or absorbed. Often, the air permeable face sheet is a thin sheet of material having a plurality of spaced perforations or openings therethrough. In order to maximize the sound absorption capability of an acoustic liner, it is desirable to maximize the number of open cells in the liner that are capable of receiving sound waves through the air permeable face sheet. Accordingly, it is desirable to minimize the number of cells and openings in the face sheet that are wholly or partially obstructed. In other words, it is desirable to maximize the acoustically treated area of an acoustic liner in order to maximize the noise suppression capability of the liner.

An acoustic liner typically includes a plurality of acoustic segments or panels. Often, adjoined edges of such segments or panels are connected together by a foaming adhesive material. Such foaming adhesives can be used to join new acoustic panel sections, or to attach replacement honeycomb sections or patches during repair of damaged acoustic panels. As shown in FIG. 1, the foaming adhesive 10 typically at least partially fills cells 12 along adjoined edges 14, 16 of the acoustic cellular core sections 18, 20. The foaming adhesive 10 also can at least partially fill other cells 26 adjacent to the adjoined edges 14, 16. The foaming adhesive 10 also typically blocks at least some openings 22 in the perforated inner skin 24 along the joint. Accordingly, the foaming adhesive 10 effectively prevents sound waves from entering the blocked and partially blocked cells 12, 26 of the core sections 18, 20. As a result, the sound suppression capability of the associated acoustic liner is less than it would be if the openings 22 and cells 12, 26 were unblocked by the foaming adhesive 10.

Accordingly, there is a need for an alternative method of joining abutting edges of acoustic honeycomb sandwich panel sections that has little or no impact on the sound suppression properties of the panel sections. Preferably, such a method will provide a joint construction that obstructs substantially none of the affected cells or face sheet openings along the joint, thereby maximizing the total acoustically treated area of a multi-section acoustic liner.

SUMMARY OF THE INVENTION

The invention includes a method of joining edges of adjacent honeycomb core panel sections. In one embodiment, the method includes forming a first edge along a first cellular core panel section. The first edge includes a first plurality of edge cell walls therealong. The method further includes forming a second edge along a second cellular core panel section, wherein the second edge includes a second plurality of edge cell walls therealong. The first edge is positioned proximate to the second edge. Still further, the method includes mechanically interlocking at least a portion of at least one of the first plurality of edge cell walls with at least a portion of at least one of the second plurality of edge cell walls to form a joint therebetween.

The invention also includes a composite structure including a first cellular core section having a first edge with a first plurality of edge cell walls, and a second cellular core section having a second edge with a second plurality of edge cell walls. The second edge is proximate to the first edge. At least a first portion of at least one of the first plurality of edge cell walls is mechanically interlocked with at least a second portion of at least one of the second plurality of edge cell walls, thereby forming a joint therebetween.

The invention also includes a tool for mechanically interlocking overlapping cell wall portions of adjacent honeycomb core sections. In one embodiment, the tool includes an elongated shank having a proximal end and a distal end. The distal end of the shank includes an elongated slot. A handle is provided on the proximal end of the shank.

These and other aspects of the invention will be understood from a reading of the following detailed description together with the drawings.

DETAILED DESCRIPTION

Figure 1:
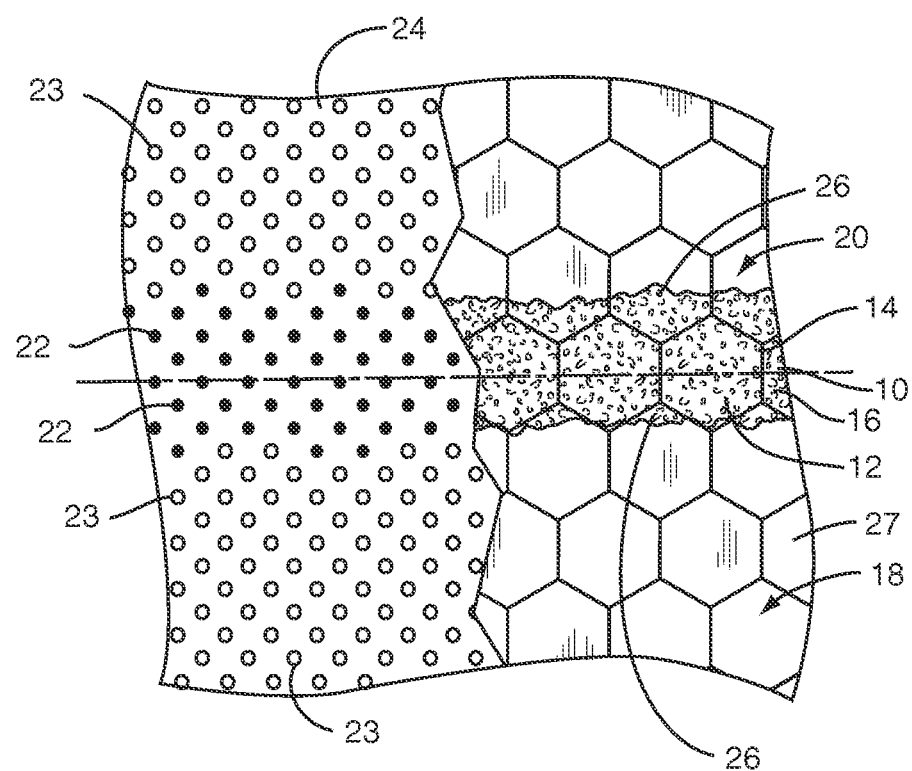
FIG. 1 is a plan view showing a portion of a prior art joint connecting abutting edges of two honeycomb panels.
Figure 2:
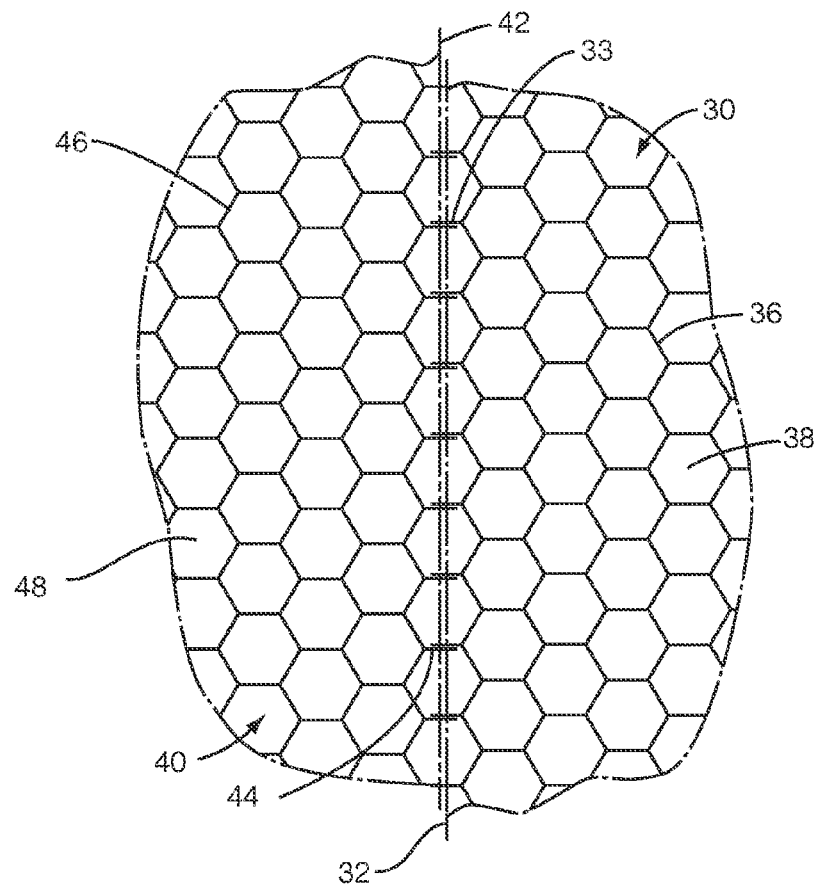
FIG. 2 is a plan view of portions of first and second honeycomb sheets having abutting first and second edges.
Figure 3:
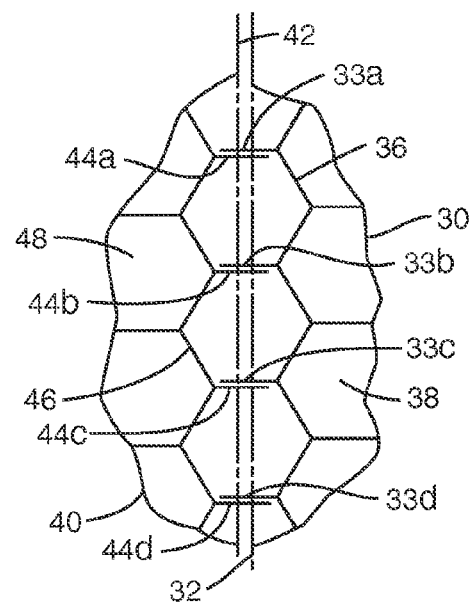
FIG. 3 is a first detail view showing portions of the first and second abutting edges of the first and second honeycomb sheets of FIG. 2.
Figure 4:
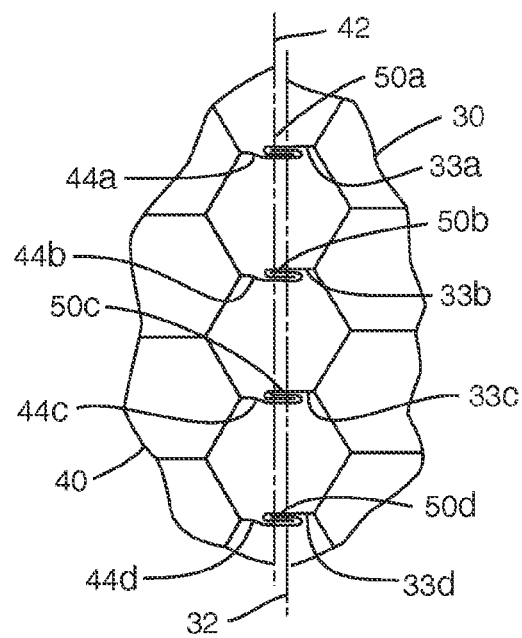
FIG. 4 is a second detail view showing portions the first and second abutting edges of FIGS. 2 and 3 with mechanically interlocked cell walls joining the first and second honeycomb sheets.

One method of joining honeycomb panel sections according to the invention is shown in FIGS. 2-4. As shown in FIGS. 2 and 3, a first honeycomb sheet 30 includes an array of open cells 38 formed by a matrix of thin cell walls 36. The first honeycomb sheet 30 further includes a first edge 32 having a first plurality of edge cell walls 33 along the first edge 32. A second honeycomb sheet 40 includes a second array of cells 48 formed by a matrix of thin cell walls 46. The second honeycomb sheet 40 includes a second edge 42 having a second plurality of edge cell walls 44 along the second edge 42. Preferably, the cell walls 33, 36, 44, 46 are constructed of a ductile metal foil such as aluminum or titanium. Alternatively, the cell walls 33, 36, 44, 46 may be constructed of one or more other ductile materials.

As shown in FIGS. 2 and 3, the first edge 32 and the second edge 42 are positioned proximate to each other such that at least a portion of the first plurality of edge cell walls 33 is proximate to at least a portion of the second plurality of edge cell walls 44. For example, as shown in FIG. 3, edge cell wall 33a is positioned proximate to corresponding edge cell wall 44a, edge cell wall 33b is positioned proximate to corresponding edge cell wall 44b, etc. In a preferred embodiment, substantially all of the first plurality of edge cell walls 33 are positioned such that each edge cell wall 33 is proximate to at least one of the second plurality of edge cell walls 44 as shown in FIGS. 2 and 3. Alternatively, one or more of the first plurality of edge cell walls 33 may be positioned proximate to at least one of the second plurality of edge cell walls 44. For example, one or more of the first or second edge cell walls 33, 44 shown in FIG. 2 may be damaged or missing, thereby preventing a particular corresponding pair of edge cell walls 33, 44 from being positioned proximate to each other.

As shown in FIG. 4, one or more of the edge cell walls 33 along the first edge 32 is mechanically interlocked with a corresponding edge cell wall 44 along the second edge 42 by forming at least portions of the cell walls 33, 44 into an interlocking or hooked arrangement. For example, a portion of edge cell wall 33a and a portion of edge cell wall 44a are plastically deformed such that they at least partially interlock with other, edge cell wall 33b and edge cell wall 44b are plastically deformed such that they at least partially interlock with each other, and so on. The interlocked portions of each pair of corresponding cell walls 33, 44 form a joint or seam 50 that at least partially restricts relative movement between the adjoined honeycomb sections 30, 40. As used herein, the term "mechanically interlocked" means at least partially joined without the use of one or more fasteners or adhesives such that at least some relative movement is prevented or impeded.

Figure 5A:
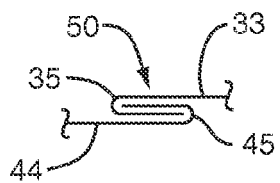
FIG. 5A is a cross-sectional view of a single lock seam between a pair of mechanically interlocked cell walls.
Figure 5B:
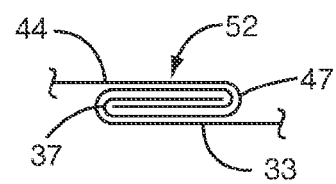
FIG. 5B is a cross-sectional view of a double lock seam between a pair of mechanically interlocked cell walls.
Figure 5C:
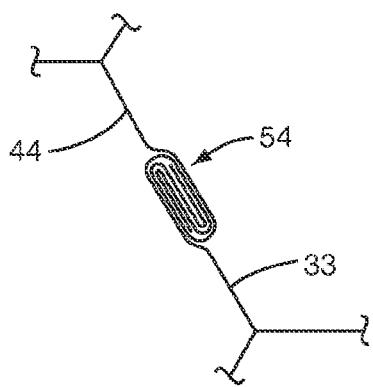
FIG. 5C is a cross-sectional view of another double lock seam between a pair of mechanically interlocked cell walls.
Figure 5D:
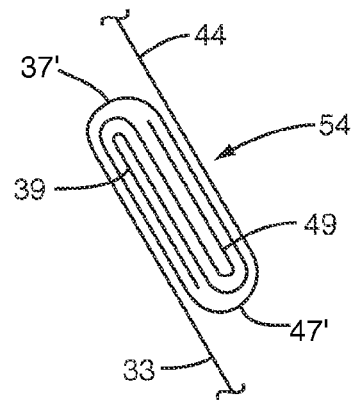
FIG. 5D is an enlarged detail view of the double lock seam shown in FIG. 5C

Examples of mechanically interlocked joints that can be used to interconnect pairs of adjacent edge cell walls 33, 44 according to the invention are shown in FIGS. 5A-5D. In FIG. 5A, a portion of a first edge cell wall 33 is formed into a first single hook portion 35, and a portion of second edge cell wall 44 is formed into a second single hook portion 45. The single hook portions 35, 45 overlap and engage each other to form a single lock seam 50. In FIG. 5B, a portion of a first edge cell wall 33 is formed into a first double hook portion 37, and a portion of second edge cell wall 44 is formed into a second double hook portion 47. The double hook portions 35, 45 engage each other to form a double lock seam 52. FIGS. 5C and 5D show an alternative double lock seam configuration 54. In this arrangement, the first double hook portion 37' includes an extra fold 39, and the second double hook portion 47' also includes at least one additional fold 49. The double lock seam 54 otherwise is substantially similar to the double lock seam 52 shown in FIG. 5B. Other mechanically interlocking joints or seams also can be used to at least partially connect edge cell walls 33, 44 together in accordance with the invention. For example, an edge cell with a single hook portion can be joined with an edge sell with a double hook portion.

Hand tools such as pliers, forceps, hemostats, or the like can be used to grasp and mechanically interlock adjacent edge cell walls 33, 44. FIGS. 6A-6G illustrate a method of using such tools to form a double lock seam 54 like that shown in FIGS. 5C and 5D.

Figure 6A:
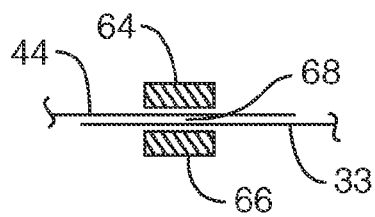
FIGS. 6A-6G are schematic representations of one series of steps for mechanically interlocking adjacent cell walls of abutting honeycomb panel sections with a gripping tool.
Figure 6B:
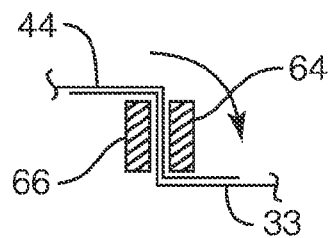
Figure 6C:
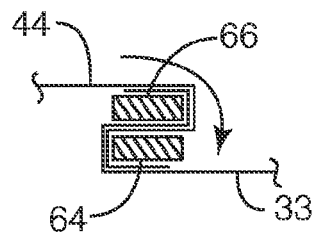
Figure 6D:
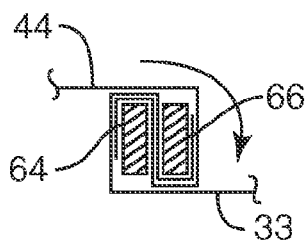
Figure 6E:
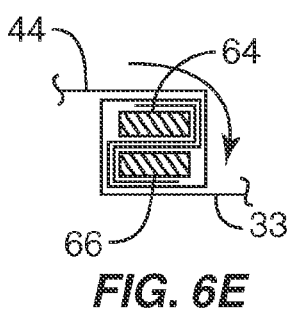
Figure 6F:
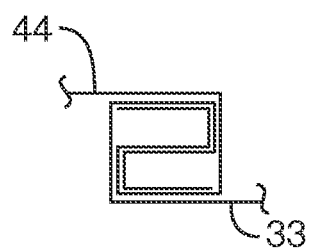
Figure 6G:
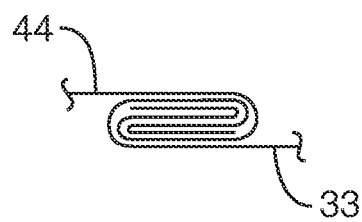

As shown in FIG. 7A, cooperating opposed jaws 64, 66 of a grasping tool (such as a pair of forceps, pliers, or the like) can be positioned over adjacent edge cell walls 33, 44 such that the walls 33, 44 are received in a clamping region 68 between the opposed first and second jaws 64,66. As the tool and opposed jaws 64, 66 of the tool are rotated, the edge cell walls 33, 44 are caused to wrap around the jaws 64, 66 as the thin cell walls 33, 34 plastically deform. FIGS. 6B-6E show sequential plastic deformation of the walls 33, 44 as the jaws 64, 66 are rotated in a clockwise direction in 90-degree increments. As shown in FIG. 6C, once the tool is rotated about 180 degrees, portions of the cell walls 33, 44 are mechanically interlocked in a single lock seam similar to that shown in FIG. 5A. As shown in FIG. 6E, once the tool is rotated 360 degrees, portions of the cell walls 33, 44 are mechanically interlocked in a double lock seam like that shown in FIGS. 5C and 5D. As shown in FIG. 6F, the jaws 4, 66 can be withdrawn from the formed seam. Optionally, as shown in FIG. 7G, after the walls have been configured into a desired interlocking arrangement, the joint or seam can be crimped with pliers, forceps, or the like to tighten the engagement between the interconnected cell walls 33, 44.

Once abutting edges of two honeycomb sheets or sections are connected as described above, the joints or seams between interlocking edge cell walls 33, 34 substantially resist relative movement between the adjoined honeycomb sheets. In addition, at least some of the joints or seams may be capable of transmitting at least some mechanical loads between the adjoined cell walls 33, 34 and honeycomb panel sections. One or more facing sheets and/or one or more backing sheets can be adhered to faces of the mechanically interlocked honeycomb core sections using methods known to persons of ordinary skill in the art.

Figure 7:
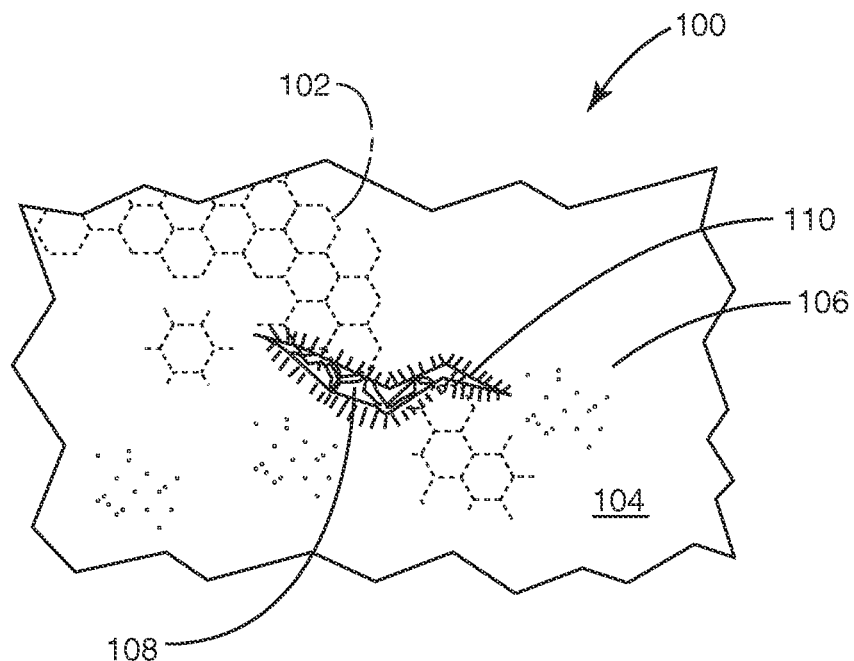
FIG. 7 is a plan view of a damaged portion of an acoustic liner having a honeycomb core.

A method for joining abutting edges of honeycomb core sections like that described above can be used for original construction of multi-section acoustic panels or liners, and also can be used to repair a damaged acoustic panel or liner. For example, FIGS. 7-12 illustrate a method of repairing a damaged section 110 of an acoustic honeycomb sandwich panel or liner 100 having an open cell core 102 and a face sheet 104 with a plurality of spaced perforations 106 therethrough. As shown in FIG. 7, the damaged section 110 may include a plurality of damaged cell walls 108.

Figure 8:
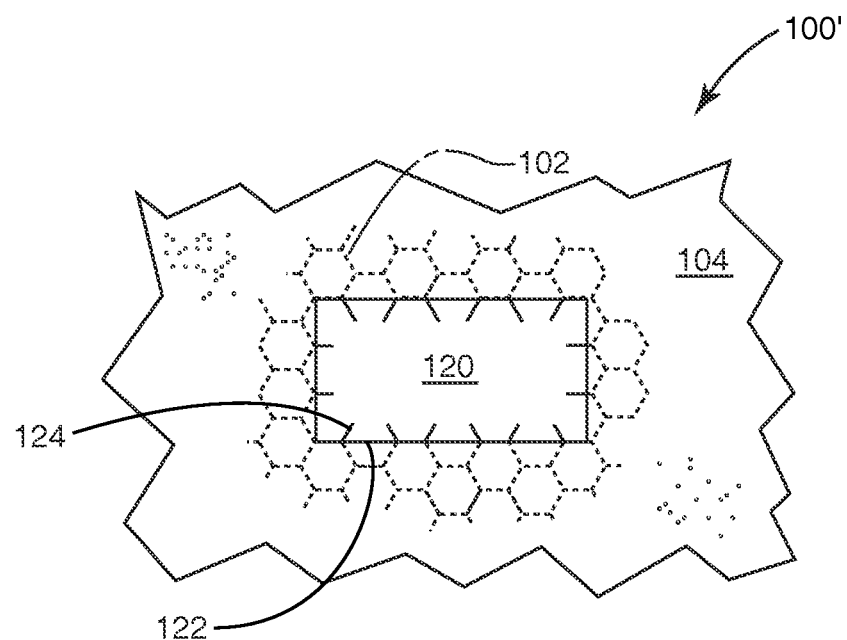
FIG. 8 is a plan view of the acoustic liner of FIG. 7 with the damaged portion removed.
Figure 9:
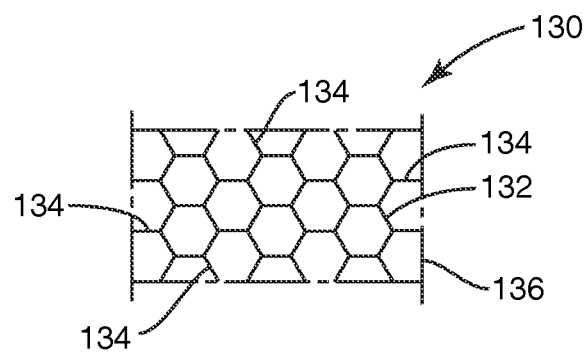
FIG. 9 is a plan view of a honeycomb matrix patch for use in repairing the acoustic liner of FIG. 8.
Figure 10:
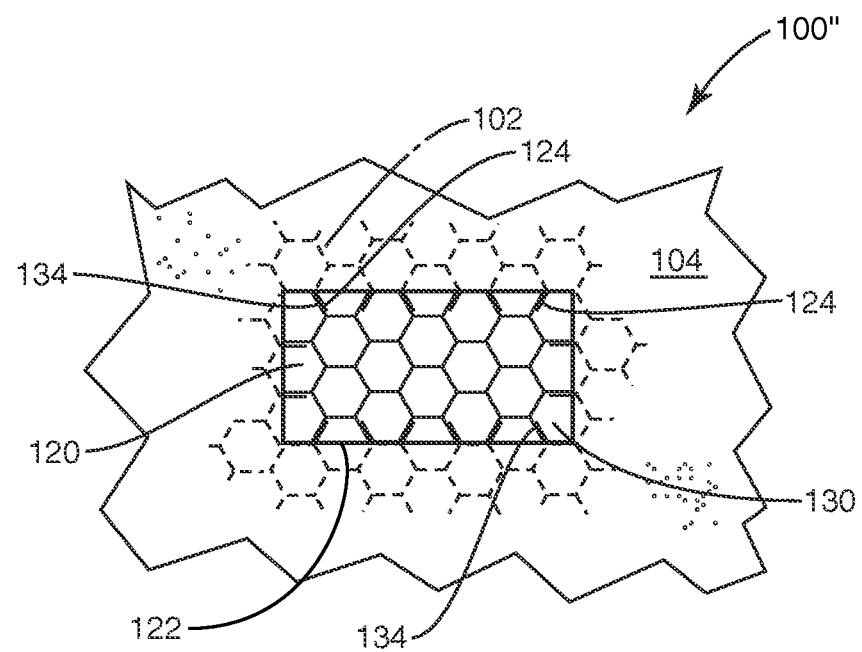
FIG. 10 is a plan view of the acoustic liner of FIG. 8 with the patch section of FIG. 9 inserted into the opening formed by removal of the damaged section.
Figure 11:
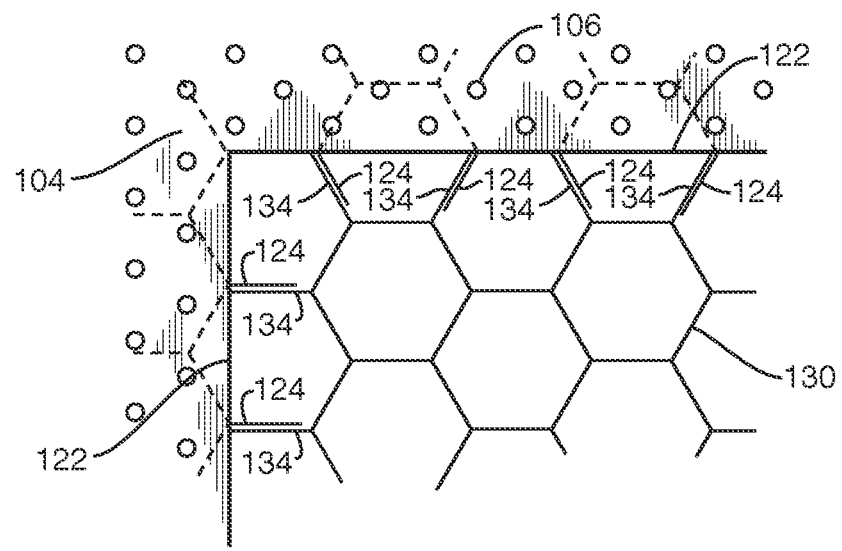
FIG. 11 is a plan view of a portion of the abutting edges of the acoustic liner and the patch section shown in FIG. 10.
Figure 12:
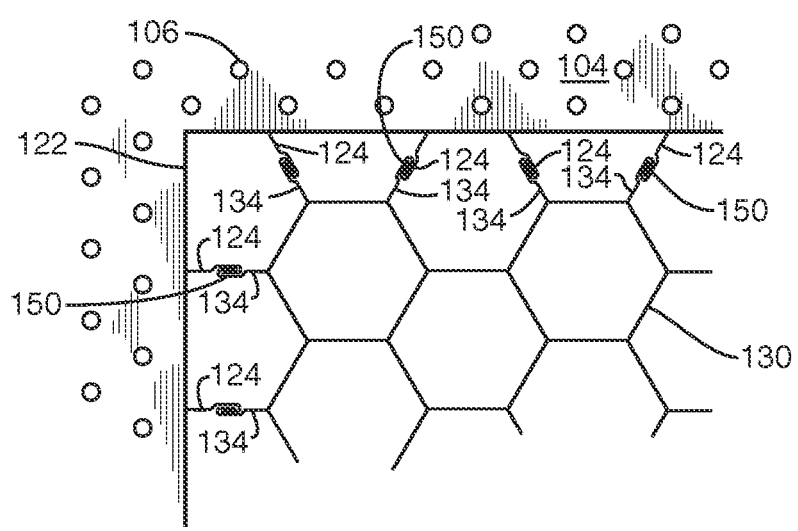
FIG. 12 is a plan view of the portion of the abutting edges shown in FIG. 12 with a plurality of cell walls of the acoustic panel and the patch section mechanically interlocked with each other.

As shown in FIG. 8, a portion of the acoustic liner 100' containing the damaged cell walls 108 is removed to form a cavity 120. Though the cavity 120 shown in FIG. 8 has a substantially rectangular shape, the cavity 120 can have substantially any desired shape, including other polygonal or irregular shapes. Preferably, care is taken during removal of the damaged portion 110 of the liner 100 such that a plurality of edge cell walls 124 remain substantially intact along edges 122 of the cavity 120. As shown in FIG. 9, a patch 130 is formed from a honeycomb sheet having a plurality of cell walls 132. Preferably, the honeycomb structure of the patch 130 is the same as or substantially similar to, the honeycomb structure and cell walls of the damaged acoustic liner 100. The outer edges 136 of the patch 130 substantially correspond in size and shape to the cavity 120 formed in the liner 100'. The outer edges 136 of the patch include a plurality of edge cell walls 134 along the edges 136. As shown in FIGS. 10 and 11, the honeycomb patch 130 is positioned within the cavity 120 such that at least some of the edge cell walls 134 of the patch 130 are proximate to at least some of the edge cell walls 124 of the liner 100". As shown in FIG. 12, once the patch 130 is so positioned, corresponding sets of edge cell walls 124, 134 can be mechanically interlocked to form interlocking joints or seams 150 using the methods described above. One or more facing sheets and/or backing sheets or portions thereof can be adhered to faces of the mechanically interlocked honeycomb core sections using methods known to persons of ordinary skill in the art.

The above descriptions of embodiments of the invention are intended to describe and illustrate various aspects of the invention. Persons of ordinary skill in the art will recognize that certain modifications can be made to the described embodiments without departing from the scope of the invention. For example, the adjoined honeycomb sections shown in the Figures are depicted with substantially uniform abutting edges and substantially uniformly aligned and spaced interlocking edge cell walls. The invention also includes joining honeycomb sections having irregularly shaped edges, and mechanically interlocking one or more edge cell walls at intermittent or non-uniformly spaced locations. In addition, various mechanically interlocking connections between edge cell walls other than those shown in the Figures and described above can be employed. All such modifications are intended to be within the scope of the appended claims.

What is claimed is:

1. A composite structure comprising:
    a first cellular core section having a first edge with a first plurality of edge cell walls along the first edge;
    a second cellular core section having a second edge with a second plurality of edge cell walls along the second edge,
    wherein the second edge faces and opposes the first edge;
    wherein the first plurality of edge cell walls face the second plurality of cell edge walls, and
    wherein a first portion of an edge cell wall of the first plurality of edge cell walls is plastically deformed to mechanically interlock with a second portion of an edge cell wall of the second plurality of edge cell walls, thereby forming a fixed joint therebetween, the first portion being continuous with the edge cell wall of the first plurality of edge cell walls and the second portion being continuous with the edge cell wall of the second plurality of edge cell walls.

2. The composite structure according to claim 1, wherein the first portion comprises a first hook portion, the second portion comprises a second hook portion, and the first and second hook portions are at least partially interlocked with each other.

3. The composite structure according to claim 1, wherein the first portion comprises a first double hook portion, the second portion comprises a second double hook portion, and the first and second double hook portions are at least partially interlocked with each other.

4. The composite structure according to claim 1, wherein the edge cell wall including the first portion and the edge cell wall including the second portion comprise metal foil.

5. The composite structure according to claim 1, wherein the joint is disposed between a first cell having a first volume and a second cell having a second volume, and wherein the joint occupies substantially none of the first volume or the second volume.

6. The composite structure according to claim 1, further comprising:
    at least one imperforate backing sheet on the first and second cellular core sections; and
    at least one air permeable face sheet on the first and second cellular core sections.

7. The composite structure according to claim 1, wherein portions of at least two of the first plurality of edge cell walls are mechanically interlocked with portions of at least two of the second plurality of edge cell walls.

* * * * *